United States Patent [19]

Grychtol et al.

[11] Patent Number: 4,537,955
[45] Date of Patent: Aug. 27, 1985

[54] UNSYMMETRICAL 1:2 CHROMIUM COMPLEX OF A MONOAZO DYESTUFF AND A DISAZO DYESTUFF WHICH IS NON-FIBER REACTIVE AND CONTAINS NO SULFONAMIDO OR AMINO GROUPS

[75] Inventors: Klaus Grychtol, Bad Durkheim; Hans Baumann, Wachenheim, both of Fed. Rep. of Germany

[73] Assignee: BASF Aktiengesellschaft, Ludwigshafen, Fed. Rep. of Germany

[21] Appl. No.: 470,943

[22] Filed: Mar. 1, 1983

[30] Foreign Application Priority Data

Mar. 2, 1982 [DE] Fed. Rep. of Germany ....... 3207331

[51] Int. Cl.³ ................ C09B 45/06; C09B 45/16; C09B 45/26; D06P 1/10
[52] U.S. Cl. .................. 534/696; 534/602; 534/697; 534/698; 534/700; 534/712; 534/722; 534/724; 534/763; 534/827; 534/840
[58] Field of Search ............ 260/145 A, 145 B; 534/696

[56] References Cited

U.S. PATENT DOCUMENTS

| | | | |
|---|---|---|---|
| 2,580,867 | 1/1952 | Wehrli et al. | 260/148 |
| 2,690,438 | 9/1954 | Kracker | 260/187 |
| 2,775,581 | 12/1956 | Neier et al. | 260/145 A |
| 3,398,132 | 8/1968 | Dehnert | 260/145 A |
| 3,525,732 | 8/1970 | Beffa et al. | 260/145 A |
| 3,625,935 | 12/1971 | Back et al. | 260/145 A |
| 4,212,802 | 7/1980 | Vogel et al. | 260/145 A |
| 4,358,287 | 11/1982 | Nicki et al. | 260/145 A X |

FOREIGN PATENT DOCUMENTS

| | | | |
|---|---|---|---|
| 37377 | 3/1981 | European Pat. Off. | 260/145 A |
| 829644 | 12/1951 | Fed. Rep. of Germany | 260/145 A |
| 896187 | 11/1953 | Fed. Rep. of Germany | 260/145 A |
| 963898 | 5/1957 | Fed. Rep. of Germany | 260/145 A |
| 1111318 | 7/1961 | Fed. Rep. of Germany | 260/145 A |
| 1544364 | 4/1970 | Fed. Rep. of Germany | 260/145 A |
| 2832756 | 2/1979 | Fed. Rep. of Germany | 260/145 A |
| 851861 | 10/1960 | United Kingdom | 260/145 A |

OTHER PUBLICATIONS

Vogel et al. III, Chemical Abstracts, vol. 92, #95623s (1980).

Primary Examiner—Floyd D. Higel
Attorney, Agent, or Firm—Oblon, Fisher, Spivak, McClelland & Maier

[57] ABSTRACT

An unsymmetrical 1:2 chromium complex of a monoazo dyestuff and a disazo dyestuff which is non-fiber reactive and is free of sulfonamido and amino groups and which, in the form of the free acid has the formula:

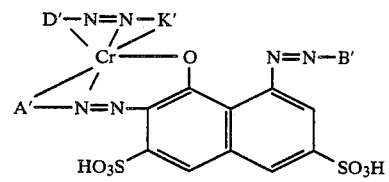

wherein A' is the radical of a 1-hydroxy-2-aminobenzene which is monosubstituted or disubstituted by chlorine, nitro, or sulfo, B' is a naphth-2-ol, resorcinol, p-($C_1$–$C_6$-alkyl)-phenol, 1-phenol-3-methylpyrazol-5-one or acetoacetanilide radical, and the phenol group in the last two mentioned compounds can be substituted by $C_1$–$C_4$-alkyl $C_1$–$C_4$-alkoxy, chlorine or sulfo, K' is an unsubstituted or sulfo-substituted naphth-1-ol or naphth-2-ol radical, phenol which is substituted in the p-positioned by $C_1$–$C_6$-alkyl, an unsubstituted or sulfo-substituted 2-naphthylanime, and 1-phenol-3-methyl-pyrazol-5-one or an acetoactanilide radical, and the phenol group in the last two mentioned compounds can be substituted by $C_1$–$C_4$-alkoxy, chlorine or sulfo, and D' is the radical of a 1-hydroxy-2-aminobenzene or 1-amino-2-hydroxynaphthalene which is further substituted by nitro, sulfo or a mixture thereof.

These dyes do not contain any fiber-reactive groups and are useful for dyeing various natural or synthetic nylon materials. In particular, the present dyes are useful for dying wool and leather. These dyes have good color strength, are high-hiding and have good fastness to washing and perspiration.

2 Claims, No Drawings

UNSYMMETRICAL 1:2 CHROMIUM COMPLEX OF A MONOAZO DYESTUFF AND A DISAZO DYESTUFF WHICH IS NON-FIBER REACTIVE AND CONTAINS NO SULFONAMIDO OR AMINO GROUPS

The present invention relates to compounds which are free of sulfonamido and amino groups and, in the form of the free acids, correspond to the general formula I

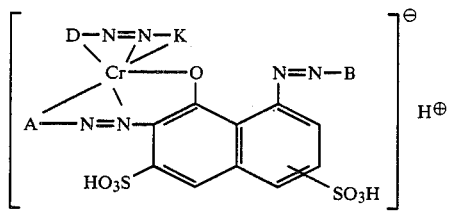

where A is a radical of a diazo component of the benzene or naphthalene series, having a hydroxyl or carboxyl group in the position adjacent to the azo bridge, B and K are each the radical of a coupling component and D is the radical of an aromatic diazo component, and K and D each carry a metallizable group ortho to the azo group, with the proviso that the compounds of the formula I possess a total of 4 or 5 sulfo groups.

The dyes of the formula (I) do not contain any fiber-reactive groups, ie. groups which are capable of reacting with cellulose or nylon material under the conventional dyeing conditions to form a chemical bond. The dyes of the formula I do not possess any sulfonamido, free amino or monoalkylamino groups.

Preferably, the radical A carries a hydroxyl group ortho to the diazo group.

The radical B is preferably derived from one of the following groups of coupling components: phenols, naphthols, pyrazolones, pyridones, acetoacetamides and in particular acetoacetanilides.

The radicals A and B can carry one or more further substituents, for example lower alkyl or alkoxy, chlorine, bromine, nitro, cyano, sulfoamino or acylamino. For the purposes of the invention, lower alkyl or alkoxy groups are those of 1 to 6, preferably 1 to 2, carbon atoms, and acylamino radicals are lower alkanoylamino, alkoxycarbonylamino or aroylamino radicals.

The radical A is derived from, for example, one of the following amines: anthranilic acid, 4- or 5-sulfoanthranilic acid, 2-amino-1-hydroxybenzene, 4-chloro- or 4,6-dichloro-2-amino-1-hydroxybenzene, 4- or 5-nitro-2-amino-1-hydroxybenzene, 4-chloro-, 4-methyl- or 4-acetylamino-6-nitro-2-amino-1-hydroxybenzene, 6-acetylamino- or 6-chloro-4-nitro-2-amino-1-hydroxybenzene, 4-cyano-2-amino-1-hydroxybenzene, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 5-nitro- or 6-nitro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid or 2-amino-1-hydroxybenzene-4,6-disulfonic acid.

Instead of the above hydroxyl-containing amines, it is also possible to employ the corresponding methoxy compounds or the corresponding compounds whose hydroxyl groups have been tosylated, eg. anisidine, 4- or 5-chloroanisidine, 4- or 5-nitroanisidine, anisidine-4- or -5-sulfonic acid or tosylated 1-hydroxy-2-aminobenzene, the methoxy or O-tosyl group being converted to an OH group in the metallization. Compounds containing these groups are employed in particular when the corresponding 1-hydroxy-2-amino compounds do not couple readily.

A is preferably a radical of a 1-hydroxy-2-aminobenzene which is substituted by chlorine, nitro and/or sulfo, in particular a radical of a 1-hydroxy-2-amino-4-nitrobenzene which may or may not carry a sulfo group.

Preferred coupling components B are the following: phenol which is unsubstituted or substituted by lower alkyl or alkoxy or acylamino, the latter having the above meaning, resorcinol, or naphthols which are unsubstituted or substituted by lower alkyl, alkoxy, chlorine, acylamino or sulfo, acylamino having the above meaning; 5-pyrazolones which in the 1-position have a phenyl or naphthyl radical which is unsubstituted or substituted by chlorine, nitro, lower alkyl or alkoxy or sulfo, and in the 3-position have $C_1$–$C_4$-alkyl, in particular methyl; acetoacetanilides and benzoylacetanilides which can be unsubstituted or substituted in the anilide nucleus by chlorine, bromine, lower alkyl or alkoxy or sulfo, and 6-hydroxy-3-cyano- and 6-hydroxy-3-carboxamido-4-alkyl-2-pyridones which are substituted in the 1-position by unsubstituted or substituted lower alkyl, eg. methyl, ethyl, isopropyl, β-hydroxyethyl, β-aminoethyl or γ-isopropoxypropyl, or by phenyl, and can carry a lower alkyl group, in particular methyl, in the 4-position.

Examples of such coupling components are naphth-2-ol, 1,3- or 1,5-dihydroxynaphthalene, naphth-1-ol, 1-acetylaminonaphth-7-ol, 1-propionylaminonaphth-7-ol, 1-carbomethoxyaminonaphth-7-ol, 1-carboethoxyaminonaphth-7-ol, 1-carbopropoxyaminonaphth-7-ol, 6-acetylnaphth-2-ol, naphth-2-ol-3-, -4-, -5-, -6-, -7- or -8-sulfonic acid, naphth-1-ol-3-, -4- or -5-sulfonic acid, 4-methylnaphth-1-ol, 4-methoxynaphth-1-ol, 4-acetylnaphth-1-ol, 5,8-di-chloronaphth-1-ol, 5-chloronaphth-1-ol, 1-phenyl-3-methylpyrazol-5-one, 1-phenyl-5-pyrazol-3-onecarboxamide, 1-(2'-,3'- or 4'-methylphenyl)-3-methylpyrazol-5-one, 1-(2'-,3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-,3'- or 4'-chlorophenyl)-3-methylpyrazol-5one, 1-(2'-,3'- or 4'-nitrophenyl)-3-methylpyrazol-5-one, 1-(2',5'- or 3',4'-dichlorophenyl)-3-methylpyrazol-5-one, 1-(2',5'-dichloro-4'-sulfophenyl)-3-methylpyrazol-5-one, acetoacetanilide, acetoacetanilide-4-sulfonic acid, acetoacet-o-anisidide, acetoacet-o-toluidide, acetoacet-o-chloroanilide, acetoacet-m-xylidide, tetralol, 4-methylphenol, 3-dialkylaminophenol, in particular 3-dimethylamino- and 3-diethylaminophenol, 4-butylphenol, 4-amylphenol, especially 4-t-amylphenol, 2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, resorcinol, 1-methyl-3-cyano-4-ethyl-6-hydroxypyridone, 1-methyl-3-cyano-4-methyl-6-hydroxypyridone and 1-phenyl-3-carboxamido-4-methyl-6-hydroxypyridone.

The coupling component B is preferably a naphth-1-ol or naphth-2-ol, resorcinol, p-($C_1$-$C_6$-alkyl)-phenol, 1-phenyl-3-methylpyrazol-5-one or acetoacetanilide, and the phenyl group in the two last mentioned compounds can be substituted by $C_1$-$C_4$-alkyl, $C_1$-$C_4$-alkoxy, chlorine or sulfo.

Particularly suitable dyes of the formula D—N=N—K (II) are the conventional metallizable dyes, for example those which are free of sulfonamido, amino and monoalkyl-amino groups, and are listed in the Color Index as mordant dyes.

D is preferably a radical of a 1-hydroxy-2-aminobenzene or 1-amino-2-hydroxynaphthalene which is further substituted by nitro and/or sulfo.

K is preferably a radical of one of the following coupling components: unsubstituted or sulfo-substituted naphth-1-ol or naphth-2-ol, phenol which is substituted in the p-position by $C_1$-$C_6$-alkyl, unsubstituted or sulfo-substituted 1- or 2-naphthylamines, 1-phenyl-3-methylpyrazol-5-one or acetoacetanilide; the phenyl group in the two last mentioned compounds can be substituted by $C_1$-$C_4$-alkoxy, chlorine or sulfo.

Particularly preferred dyes according to the invention are the compounds which, in the form of the free acids, correspond to the formula III

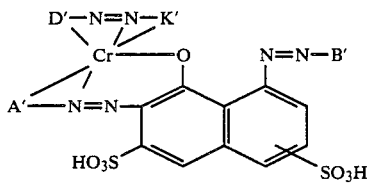

where A' is the radical of a 1-hydroxy-2-aminobenzene which is monosubstituted or disubstituted by chlorine, nitro or sulfo, B' is a naphth-2-ol, resorcinol, p-($C_1$-$C_6$-alkyl)-phenol, 1-phenyl-3-methylpyrazol-5-one or acetoacetanilide radical, and the phenyl group in the two last mentioned compounds can be substituted by $C_1$-$C_4$-alkyl, $C_1$-$C_4$-alkoxy, chlorine or sulfo, K' is an unsubstituted or sulfosubstituted naphth-1-ol or naphth-2-ol radical, phenol which is substituted in the p-position by $C_1$-$C_6$-alkyl, an unsubstituted or sulfo-substituted 2-naphthylamine, a 1-phenyl-3-methylpyrazol-5-one or an acetoacetanilide radical, and the phenyl group in the two last mentioned compounds can be substituted by $C_1$-$C_4$-alkoxy, chlorine or sulfo, and D' is the radical of a 1-hydroxy-2-aminobenzene or 1-amino-2-hydroxynaphthalene which is further substituted by nitro and/or sulfo.

The metallizable compounds of the formula IV

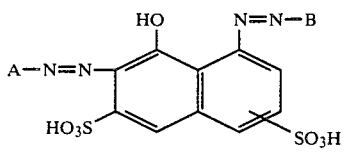

are obtained by a conventional method, by diazotizing, for example, an amine of the formula V

  V and coupling the product with a coupling component of the formula VI

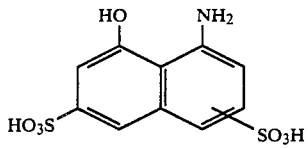

at an alkaline pH. The amino group of the naphthalene is then diazotized, and the product obtained is coupled with a coupling component B. A and B have the above meanings.

The preparation of the novel 1:2 chromium complexes of the above formula I, which contain a dye of the formula II and a dye of the formula IV, is carried out, for example, by first reacting one of these dyes, preferably the dye II, with a chromium-donating agent to give the 1:1 complex. This product is then reacted with the other dye to give a 1:2 complex. This conversion is advantageously carried out in a neutral or weakly alkaline medium, in an open or closed vessel, at elevated temperatures, eg. from 50° to 120° C. An organic solvent, eg. an alcohol or a ketone, can be employed, or the reaction can be carried out in aqueous solution, where the addition of a solvent, eg. an alcohol, formamide, etc., may promote the reaction. It is advisable in general to react stoichiometric amounts of the 1:1 complex and the metal-free dye. As a rule, an excess of metal-containing dye is not so disadvantageous as an excess of the metal-free dye.

It is also possible to react a mixture of the dyes of the formulae II and IV with a chromium-donating agent.

Another process for the preparation of the novel 1:2 chromium complexes of the above formula I comprises first preparing a 1:2 chromium complex of the formula VII

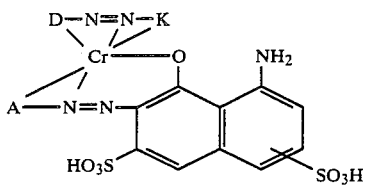

diazotizing this in a conventional manner, for example with hydrochloric acid and sodium nitrite solution, and then coupling the product to a coupling component H-B. D, K, A and B have the meanings given for formula I.

The novel chromium complex dyes obtainable by the above processes are advantageously isolated in the form of their salts, in particular alkali metal salts, such as lithium, potassium and especially sodium salts, or ammonium salts. They are useful for dyeing the various natural or synthetic nylon materials, such as wool, silk, synthetic nylon fibers and polyurethanes, in particular for dyeing wool and leather.

The novel dyes have good color strength and are high-hiding. They exhibit good build-up coupled with good fastness to washing, water, perspiration, abrasion, diffusion, light, acids and alkalis. Moreover, they are substantially insensitive to calcium salts in the dyeing bath, and hence in general permit the use of non-softened water. The good build-up on various types of leather, both on leather tanned only with chromium salts and on leather tanned with vegetable or synthetic tanning agents, should be particularly singled out, deep brown to black hues being obtained. The fact that the dyes of the formula I are particularly suitable for dyeing wool having an antifelting finish should also be singled out.

EXAMPLE 1

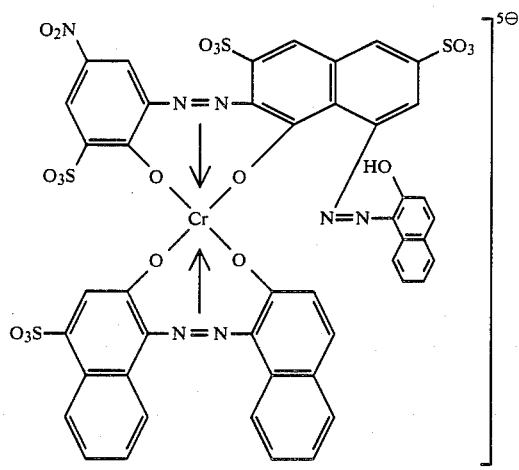

240 parts of 4-nitro-2amino-1-hydroxybenzene-6-sulfonic acid in 2,000 parts of water are stirred, and the mixture is cooled to 5° C. with hydrochloric acid and ice. 320 parts by volume of 3.3N sodium nitrite solution are added dropwise, and stirring is continued for 2 hours at 7° C. Excess nitrite is destroyed with amidosulfonic acid, and the diazo solution is then run into a solution which was prepared by dissolving 319 parts of 1-hydroxy-8-aminonaphthalene-3,6-disulfonic acid in 2,000 parts of water with 40 parts of sodium hydroxide and 150 parts of sodium carbonate, and was brought to 10° C. with ice. Coupling is complete after about two hours. The pH is brought to 6 with hydrochloric acid, and 310 parts by volume of 3.3N sodium nitrite solution are run in. The mixture is cooled to 5° C. by the addition of ice, and the pH is brought to 0.6 with hydrochloric acid. When diazotization is complete, the diazoazo dye is added to a solution of 146 parts of naphth-2ol in 2,000 parts of water, 41 parts of sodium hydroxide and 600 parts of sodium carbonate, and the coupling mixture is kept at 15° C. by the addition of ice. When coupling is complete, the product is filtered off under suction.

The paste obtained is stirred in 4,000 parts of water, and a press cake containing a 1:1 chromium complex comprising 52 parts of chromium and 384 parts of the monoazo dye obtained from diazotized 1-amino-2-hydroxynaphthalene-4-sulfonic acid and 2-hydroxynaphthalene is added. The mixture is heated to 70° C., and a pH of 7–7.5 is maintained by the addition of sodium hydroxide solution. Heating is continued until the starting materials can no longer be detected chromatographically. The dye is isolated by spray-drying, and is obtained in the form of a dark powder which is very readily soluble in water. Very fast black dyeings are obtained on wool with or without an antifelting finish. Lightfast deep black dyeings are obtained on leather, including retanned leather. Dyes having similar properties are obtained if the 1:1 chromium complexes of the following azo dyes are employed:

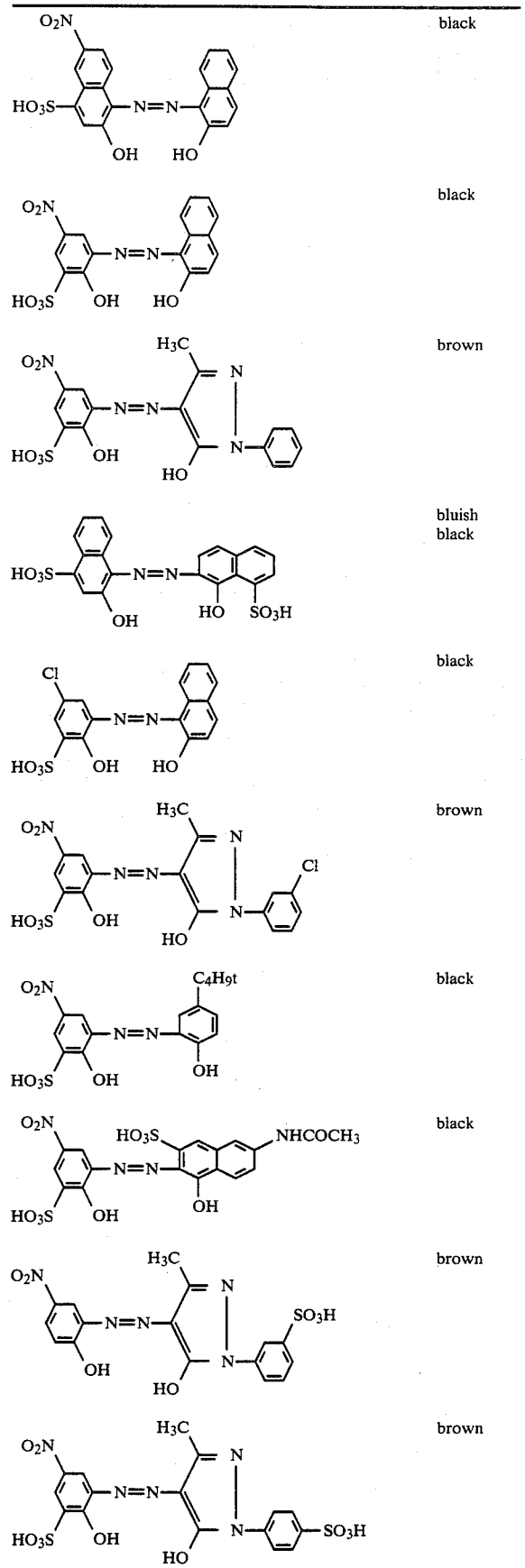

-continued

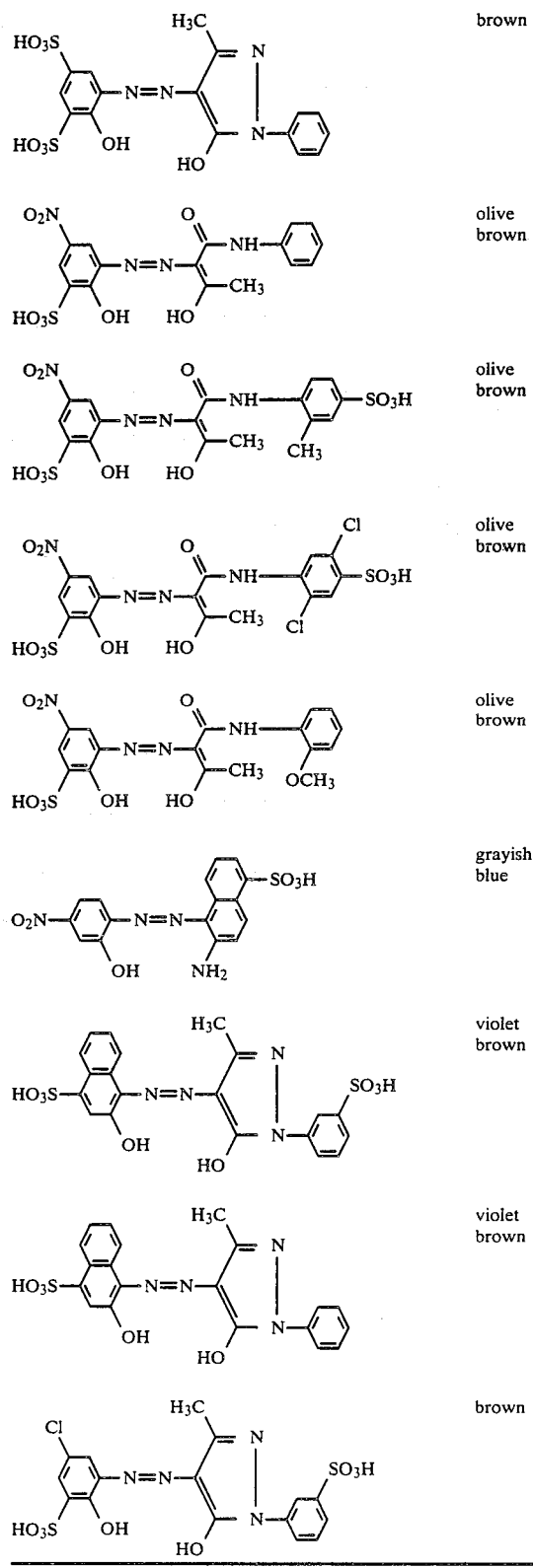

| | |
|---|---|
| | brown |
| | olive brown |
| | olive brown |
| | olive brown |
| | olive brown |
| | grayish blue |
| | violet brown |
| | violet brown |
| | brown |

EXAMPLE 2

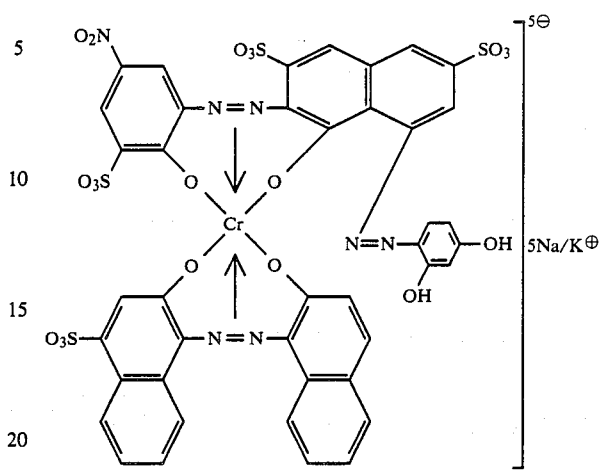

120 parts of 4-nitro-2-amino-1-hydroxybenzene-6-sulfonic acid in 1,000 parts of water are brought to 7° C. with 275 parts by volume of hydrochloric acid and ice. 160 parts by volume of 3.3N sodium nitrite solution are added dropwise, and stirring is continued for 2 hours. Excess nitrite is destroyed, and the diazo component is then run into a solution which was prepared by dissolving 160 parts of 1-hydroxy-8-aminoaphthalene-3,6-disulfonic acid in 1,000 parts of water with 20 parts of sodium hydroxide and 75 parts of sodium carbonate, and was brought to 10° C. with ice. Coupling is complete after three hours. The pH is brought to 0.6 with hydrochloric acid, and 160 parts by volume of 3.3N sodium nitrite solution are added. Diazotization is complete after 30 minutes. The diazotization mixture is run into a solution of 60 parts of resorcinol in 1,000 parts of water, 20 parts of sodium hydroxide and 250 parts of sodium carbonate. The coupling mixture is stirred overnight, and the dye is precipitated by the addition of 1,500 parts of sodium chloride, and filtered off under suction.

The press cake obtained is stirred in 2,500 parts of water, and a press cake containing a 1:1 chromium complex comprising 26 parts of chromium and 192 parts of the monoazo dye obtained from diazotized 1-amino-2-hydroxynaphthalene-4-sulfonic acid and 2-hydroxynaphthalene is added. A pH of 7–7.5 is maintained with sodium hydroxide solution, and the addition reaction is complete after seven hours at 70° C. The dye is precipitated by the addition of 1,000 parts of sodium chloride and 1,250 parts of potassium chloride, and is filtered off under suction and dried to give 325 parts of a black powder. Fast black dyeings are obtained on wool and leather.

Dyes with similar properties are obtained if the 1:1 chromium complexes of the following dyes are employed:

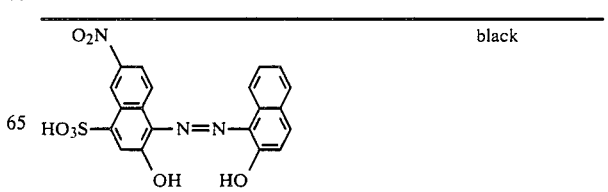

black

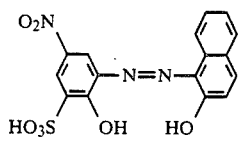 black

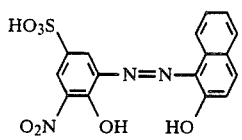 black

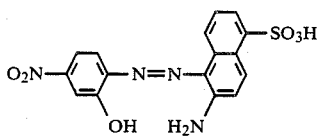 black

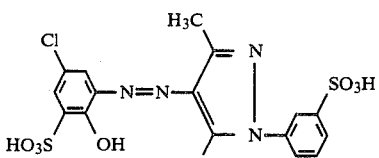 brown

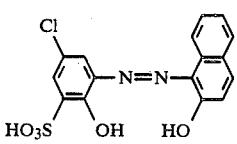 black

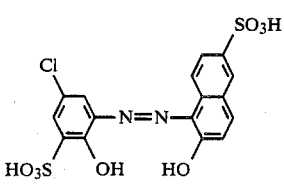 black

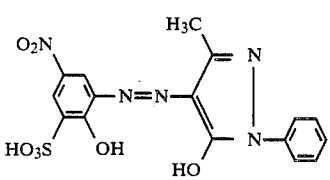 brown

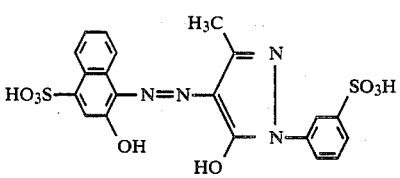 reddish brown

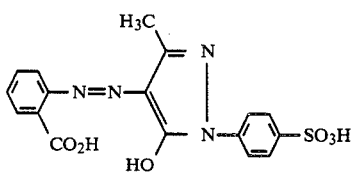 olive brown

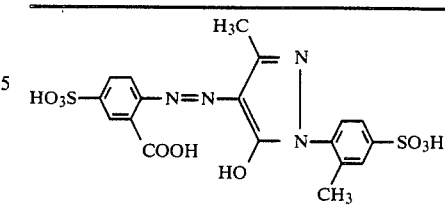 olive brown

EXAMPLE 3

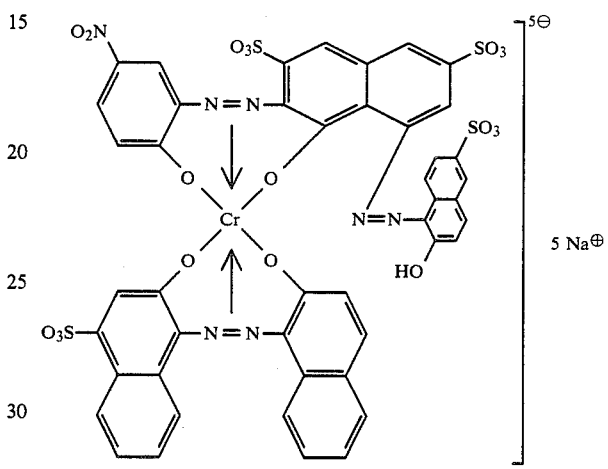

Hydrochloric acid and ice are added to 77 parts of 4-nitro-2-aminophenol in 1,000 parts of water, and diazotization is carried out by adding 160 parts by volume of 3.3N sodium nitrite solution. The diazo suspension is run into a solution of 160 parts of 1-hydroxy-8-aminonaphthalene-3,6-disulfonic acid in 1,000 parts of water, 20 parts of sodium hydroxide and 70 parts of sodium carbonate. Coupling is complete in two hours. The pH is brought to 6.5 with hydrochloric acid, 160 parts by volume of 3.3N sodium nitrite solution are added abruptly, the mixture is cooled to 10° C. with ice, and hydrochloric acid is added until the pH reaches 1.5. Diazotization is complete after three hours. Excess nitrite is destroyed with amidosulfonic acid, and the diazo component is run into a solution of 113 parts of 2-hydroxynaphthalene-6-sulfonic acid in 800 parts of water, 16 parts of sodium hydroxide and 150 parts of sodium carbonate, and the mixture is kept at 10° C. by the addition of ice. Coupling is complete overnight, and the product is filtered off under suction.

A press cake containing the 1:1 chromium complex comprising 26 parts of chromium and 192 parts of the monoazo dye obtained from diazotized 1-amino-2-hydroxynaphthalene-4-sulfonic acid and 2-hydroxynaphthalene is added to the press cake of the above product in 1,000 parts of water, the mixture is stirred for four hours at 70° C. and the pH is kept at 7.5 with dilute sodium hydroxide solution. The solution is clarified by filtration, and the product is isolated by spray-drying. The black dye powder dyes wool and leather in very fast black hues.

Similar dyes are obtained when the 1:1 chromium complexes of the following compounds are employed:

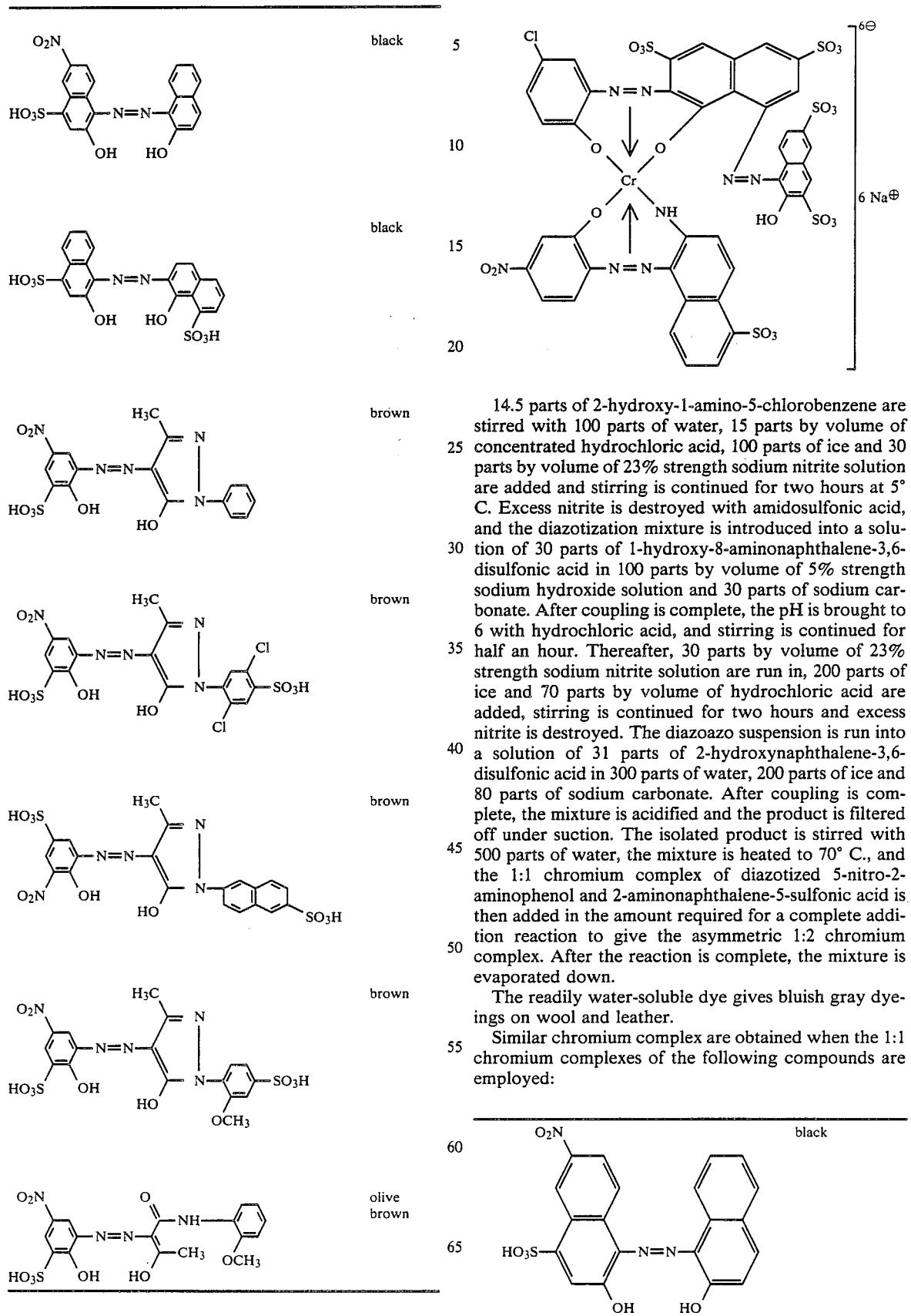

EXAMPLE 4

14.5 parts of 2-hydroxy-1-amino-5-chlorobenzene are stirred with 100 parts of water, 15 parts by volume of concentrated hydrochloric acid, 100 parts of ice and 30 parts by volume of 23% strength sodium nitrite solution are added and stirring is continued for two hours at 5° C. Excess nitrite is destroyed with amidosulfonic acid, and the diazotization mixture is introduced into a solution of 30 parts of 1-hydroxy-8-aminonaphthalene-3,6-disulfonic acid in 100 parts by volume of 5% strength sodium hydroxide solution and 30 parts of sodium carbonate. After coupling is complete, the pH is brought to 6 with hydrochloric acid, and stirring is continued for half an hour. Thereafter, 30 parts by volume of 23% strength sodium nitrite solution are run in, 200 parts of ice and 70 parts by volume of hydrochloric acid are added, stirring is continued for two hours and excess nitrite is destroyed. The diazoazo suspension is run into a solution of 31 parts of 2-hydroxynaphthalene-3,6-disulfonic acid in 300 parts of water, 200 parts of ice and 80 parts of sodium carbonate. After coupling is complete, the mixture is acidified and the product is filtered off under suction. The isolated product is stirred with 500 parts of water, the mixture is heated to 70° C., and the 1:1 chromium complex of diazotized 5-nitro-2-aminophenol and 2-aminonaphthalene-5-sulfonic acid is then added in the amount required for a complete addition reaction to give the asymmetric 1:2 chromium complex. After the reaction is complete, the mixture is evaporated down.

The readily water-soluble dye gives bluish gray dyeings on wool and leather.

Similar chromium complex are obtained when the 1:1 chromium complexes of the following compounds are employed:

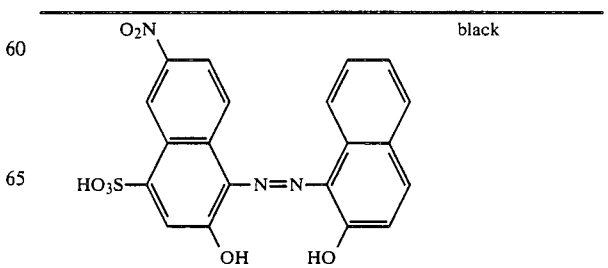

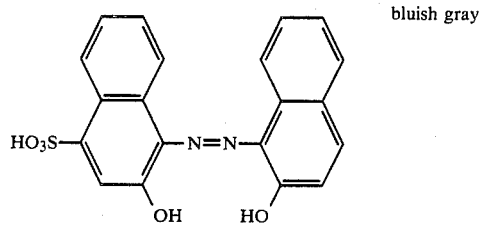

bluish gray

EXAMPLE 5

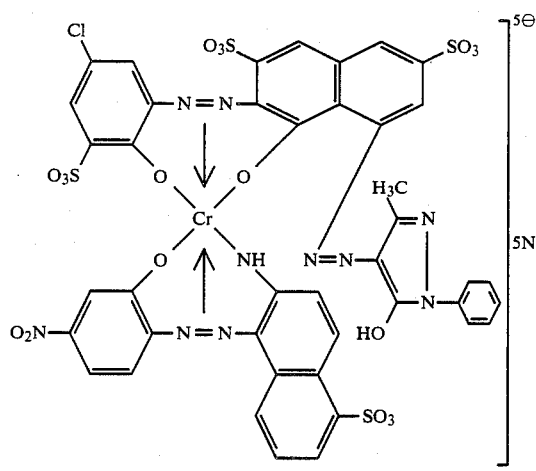

30 parts by volume of 23% strength sodium nitrite solution are added to a solution of 22.35 parts of 5-chloro-2-hydroxy-1-aminobenzene-3-sulfonic acid in 2,000 parts by volume of 2% strength sodium hydroxide solution, and this mixture is allowed to run gradually into a mixture of 30 parts by volume of concentrated hydrochloric acid and 250 parts of ice, at 0°–5° C. The entire mixture is stirred for a further 2 hours at 0°–5° C., and then slowly added to a mixture of 30 parts of 1-amino-8-hydroxynaphthalene-3,6-disulfonic acid, 100 parts by volume of 4% strength sodium hydroxide solution, 50 parts of ice and 35 parts of sodium carbonate. After coupling is complete, the coupling product is precipitated by the addition of 80 parts by volume of concentrated hydrochloric acid and 200 parts by volume of saturated sodium chloride solution, and is filtered off under suction.

The filter cake is dissolved in 500 parts of 1% strength sodium hydroxide solution. This solution, together with 30 parts by volume of 23% strength sodium nitrite solution, is gradually run into a mixture of 70 parts by volume of concentrated hydrochloric acid, 300 parts of water and 400 parts of ice. Stirring is continued for 2 hours at 0°–5° C., after which a solution of 19 parts of 1-phenyl-3-methylpyrazol-5-one in 220 parts by volume of 2% strength sodium hydroxide solution is first added to the diazotization mixture and thereafter the pH is gradually brought to 6. The diazo dye thus obtained is filtered off under suction and washed with dilute sodium chloride solution. The total amount of the dye obtained is stirred with 400 parts of water and 10 parts of 25% strength ammonia at 40° C., and the equivalent amount of the conventionally obtainable 1:1 chromium complex of the dye obtained from diazotized 4-nitro-2-hydroxy-1-aminobenzene→2-aminonaphthalene-5-sulfonic acid is then added. When the addition reaction is complete, which can be readily determined chromatographically, the entire mixture is evaporated to dryness. The resulting black powder dissolves in water to give an opaque green coloration, and dyes wool and leather in greenish black hues.

Similar dyes are obtained when the 1:1 chromium complexes of the following compounds are employed:

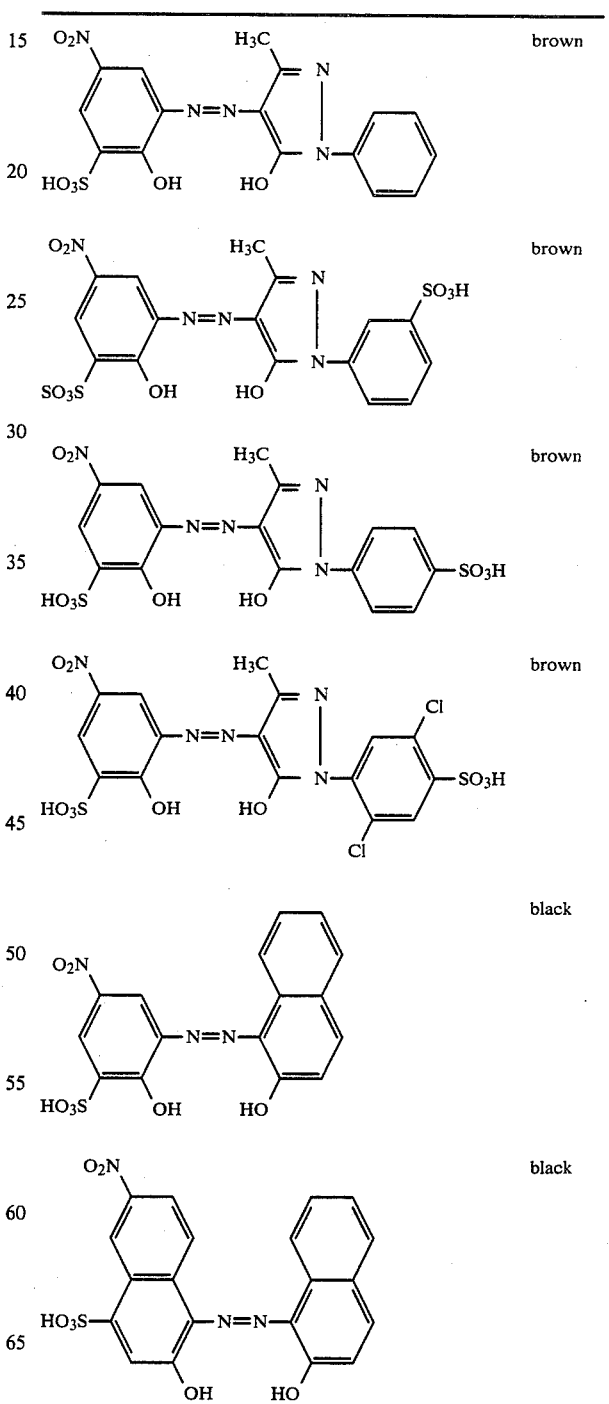

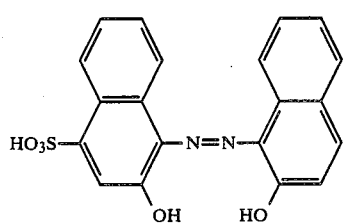
black
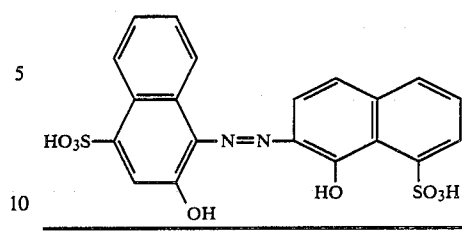
black
Dyes having similar properties are obtained if the 1:1 chromium complex of the compound given in column 1 is reacted with the disazo dye listed in column 2, in a ratio of 1:1. The dyes give fast dyeings on wool and leather, the hues obtained being those given in column 3.
| 1 | 2 | 3 |
|---|---|---|
| 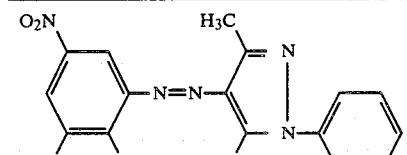 | 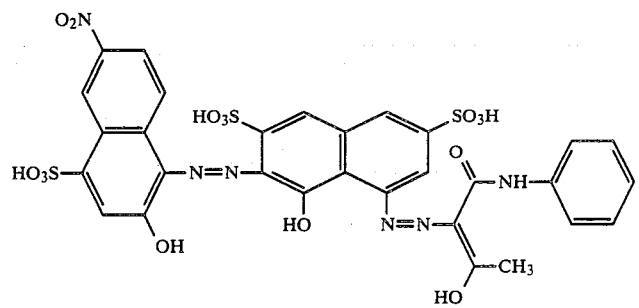 | brown |
| 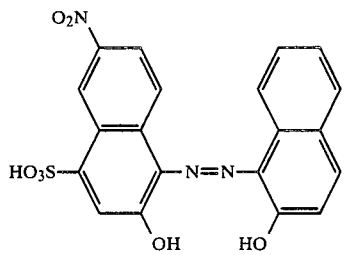 | 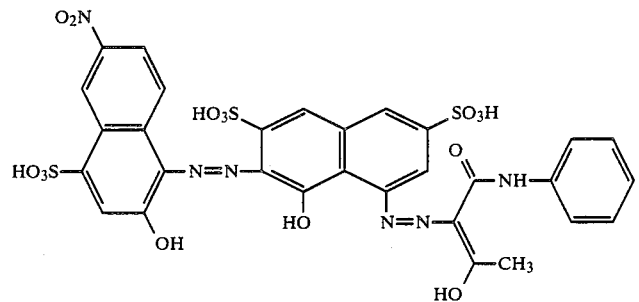 | black |
| 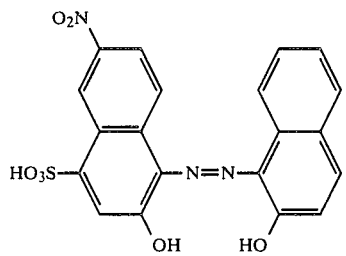 | 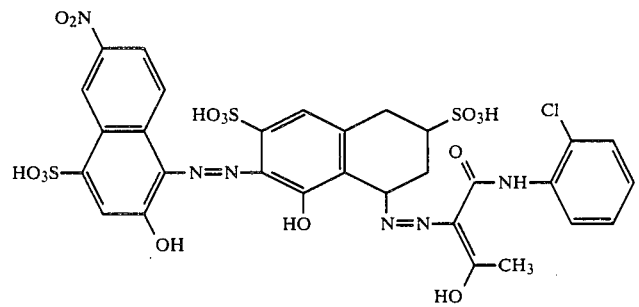 | black |

-continued
| 1 | 2 | 3 |
|---|---|---|
| 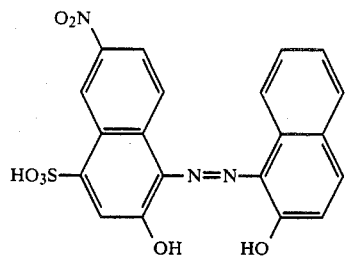 | 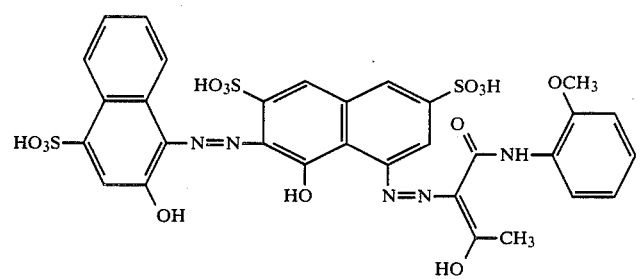 | black |
| 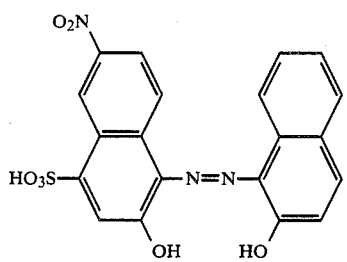 | 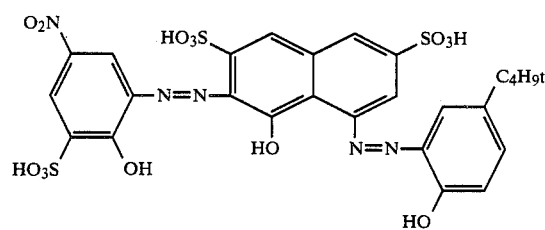 | black |
| 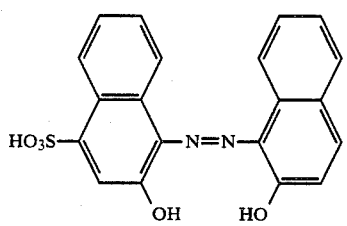 | 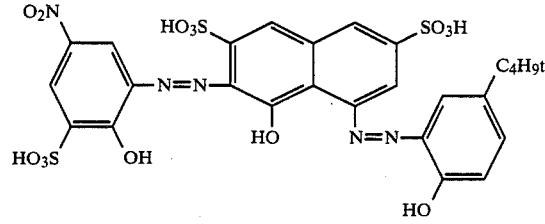 | black |
| 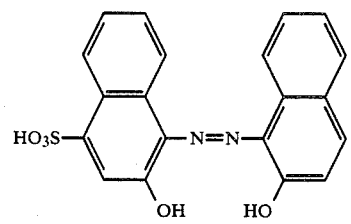 | 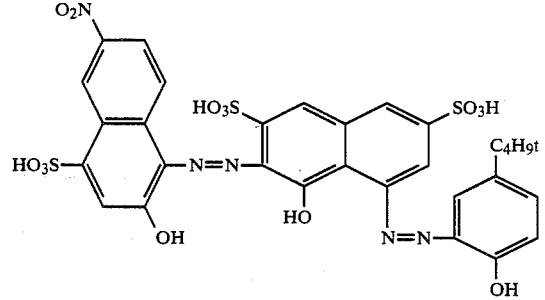 | black |
| 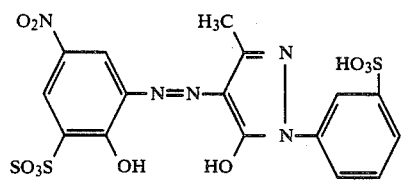 | 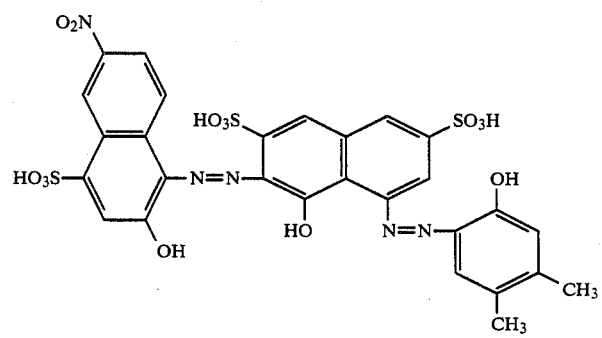 | brown |

-continued
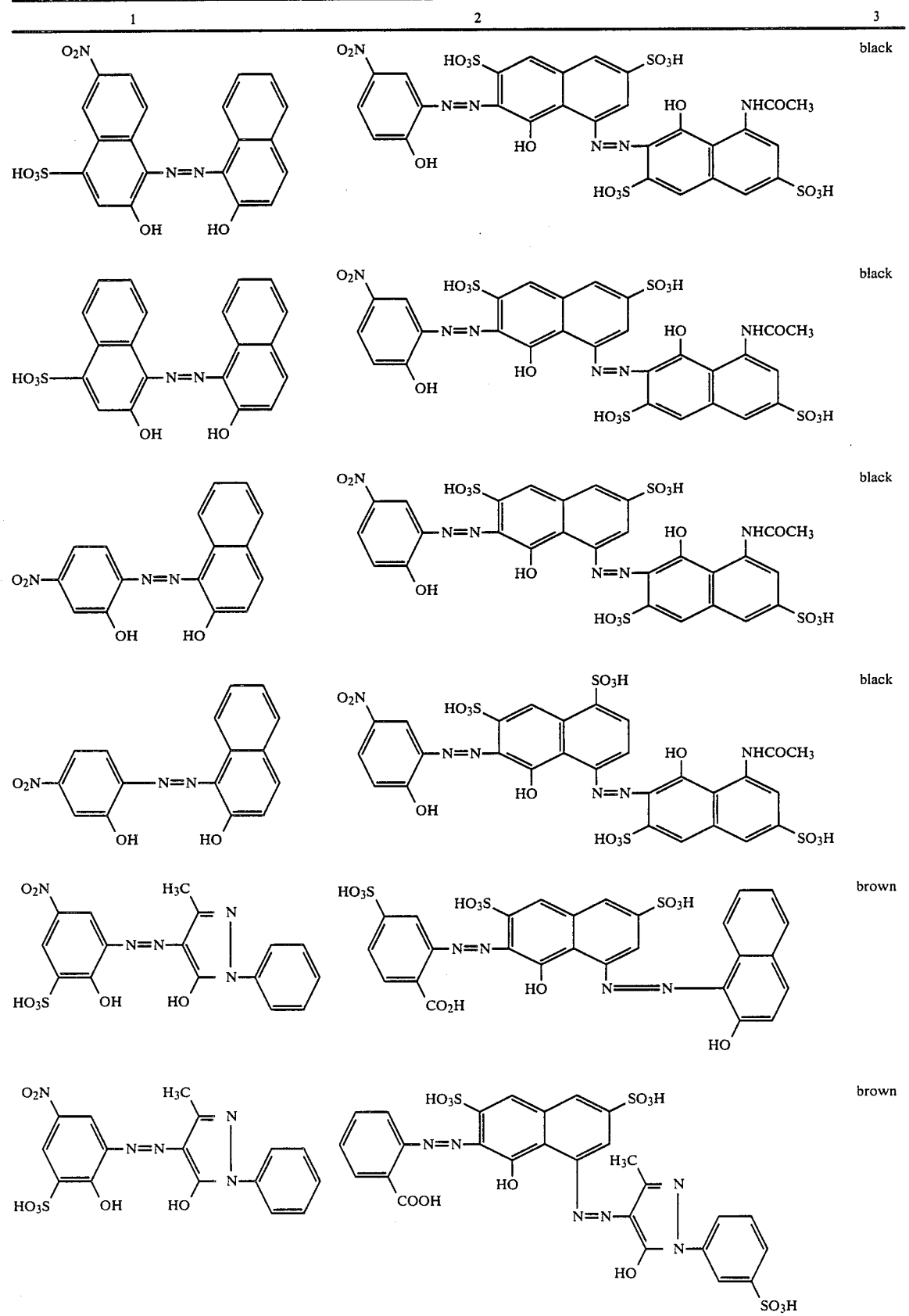

-continued

| 1 | 2 | 3 |
|---|---|---|
| 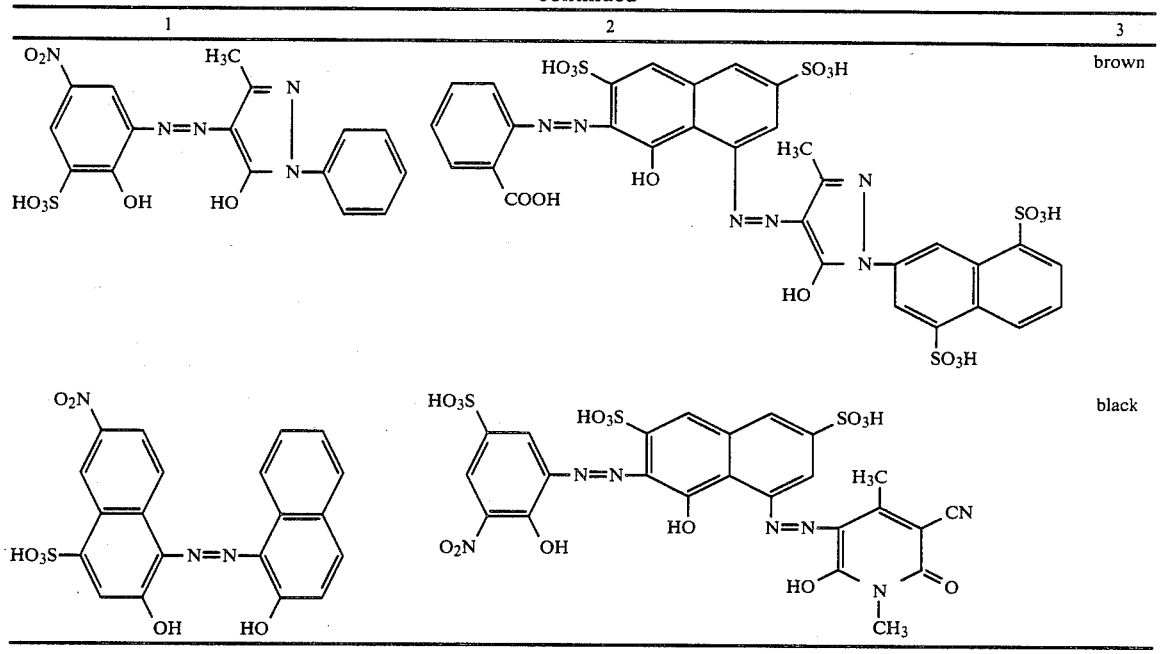 | | brown |
| | | black |

We claim:

1. An unsymmetrical 1:2 chromium complex of a monoazo dyestuff and a disazo dyestuff which is non-fiber reactive and is free of sulfonamido and amino groups, and which, in the form of the free acid, has the formula

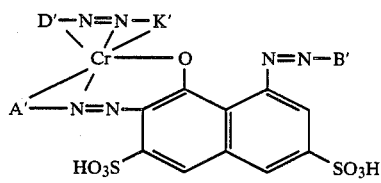

wherein A' is the radical of a 1-hydroxy-2-aminobenzene substituted by nitro, sulfo or a mixture thereof, B' is the radical of β-naphthol, K' is unsubstituted or sulfo-substituted 1- or 2-naphthol and D' is the radical of 1-hydroxy-2-aminobenzene or 1-amino-2-naphthol substituted by nitro, sulfo or a mixture thereof.

2. An unsymmetrical 1:2 chromium complex of a monoazo dyestuff and a disazo dyestuff which is non-fiber reactive and is free of sulfonamido and amino groups and which has the formula:

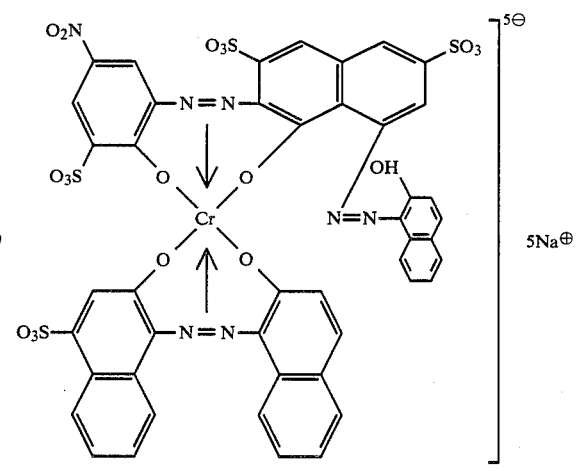

* * * * *